United States Patent
Liu et al.

(10) Patent No.: US 10,031,816 B2
(45) Date of Patent: Jul. 24, 2018

(54) SYSTEMS AND METHODS FOR HEALING IMAGES IN DEDUPLICATION STORAGE

(71) Applicant: Veritas Technologies LLC, Mountain View, CA (US)

(72) Inventors: Bin Liu, Beijing (CN); Xianbo Zhang, Plymouth, MN (US); Shuai Cheng, Beijing (CN); Cheng Shan, Beijing (CN); Wen Feng Jiang, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 131 days.

(21) Appl. No.: 15/282,626

(22) Filed: Sep. 30, 2016

(65) Prior Publication Data

US 2018/0089037 A1    Mar. 29, 2018

(51) Int. Cl.
*G06F 11/14*    (2006.01)

(52) U.S. Cl.
CPC ...... *G06F 11/1469* (2013.01); *G06F 11/1451* (2013.01); *G06F 11/1453* (2013.01); *G06F 2201/805* (2013.01); *G06F 2201/82* (2013.01); *G06F 2201/84* (2013.01)

(58) Field of Classification Search
CPC ............... G06F 11/1453; G06F 3/0641; G06F 17/30156
See application file for complete search history.

(56) References Cited

U.S. PATENT DOCUMENTS

| | | | |
|---|---|---|---|
| 7,913,114 B2 | 3/2011 | Leppard | |
| 2004/0098538 A1 | 5/2004 | Horn et al. | |
| 2011/0238828 A1 | 9/2011 | Grigsby et al. | |
| 2012/0209814 A1* | 8/2012 | Zhang | G06F 11/1453 707/654 |
| 2015/0261776 A1* | 9/2015 | Attarde | G06F 17/30156 707/664 |
| 2015/0261792 A1* | 9/2015 | Attarde | G06F 17/30303 707/616 |

OTHER PUBLICATIONS

Storage Virtualization—Wikipedia; Oct. 28, 2015; https://en.wikipedia.org/w/index.php?title=storage_virtualization&oldid=687958998.

(Continued)

*Primary Examiner* — Jigar Patel
(74) *Attorney, Agent, or Firm* — FisherBroyles LLP

(57) ABSTRACT

The disclosed computer-implemented method for healing images in deduplication storage may include (i) detecting that a data segment stored within deduplication storage is corrupted by executing an algorithm on the data segment to generate a numerical identifier for the data segment and determining that the numerical identifier does not match a previously stored numerical identifier for the data segment, (ii) checking, during a backup operation, whether a digital fingerprint of a data segment of an image being backed up matches a digital fingerprint of the corrupted data segment that was taken prior to corruption and that is already stored within the deduplication storage, and (iii) appending the data segment from the image being backed up to a container that already contains the corrupted data segment rather than replacing the corrupted data segment. Various other methods, systems, and computer-readable media are also disclosed.

20 Claims, 5 Drawing Sheets

(56) References Cited

OTHER PUBLICATIONS

Vaijayanti Bharadwaj, et al; Systems and Methods for Coordinating Data Caching on Virtual Storage Appliances; U.S. Appl. No. 14/935,836, filed Nov. 9, 2015.
VMware ESX and VMware ESXi; https://www.vmware.com/files/pdf/VMware-ESX-and-VMware-ESXi-DS-EN.pdf, as accessed Sep. 30, 2015; Product Datasheet, VMware, Inc.

* cited by examiner

US 10,031,816 B2

SYSTEMS AND METHODS FOR HEALING IMAGES IN DEDUPLICATION STORAGE

BACKGROUND

Individuals and organizations regularly seek to improve their systems for storing large amounts of data. For example, enterprise organizations may seek improved systems and techniques for compressing data or otherwise optimizing the efficiency of data storage. In one specific example, enterprise organizations may organize their data within a deduplication system. In general, deduplication refers to the process of removing redundant instances of the same data segment or portion when that data segment or portion is included multiple times within a larger collection of data. Deduplication processes may replace the redundant instances of the same data segment or portion with a reference to a single instance of the data segment. Deduplication may thereby reduce the amount of storage space used to store data, and may also obtain other efficiencies.

Of course, traditional deduplication systems rely on underlying physical, virtual, and/or software-based storage solutions to ultimately store the single instances of unique data segments. Because these underlying storage solutions are imperfect, they may sometimes fail and corresponding data segments may become corrupted. Moreover, because multiple disk images may reference the same unique data segment, a single data segment corruption may impact or compromise a wide range of customers and/or disk images. The instant disclosure, therefore, identifies and addresses a need for systems and methods for healing images in deduplication storage.

SUMMARY

As will be described in greater detail below, the instant disclosure describes various systems and methods for healing images in deduplication storage. In one example, a computer-implemented method for healing images in deduplication storage may include (i) detecting that a data segment stored within deduplication storage is corrupted by executing an algorithm on the data segment to generate a numerical identifier for the data segment and determining that the numerical identifier does not match a previously stored numerical identifier for the data segment, (ii) checking, during a backup operation, whether a digital fingerprint of a data segment of an image being backed up matches a digital fingerprint of the corrupted data segment that was taken prior to corruption and that is already stored within the deduplication storage, and (iii) appending, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment.

In one embodiment, the algorithm may include (i) a checksum algorithm, (ii) a hash algorithm, and/or (iii) a digital fingerprint algorithm. In some examples, appending the data segment from the image being backed up to the container effectively heals at least one image that references the corrupted data segment.

In one embodiment, the computer-implemented method may further include providing, during a restore operation to restore an image that references the corrupted data segment, the appended data segment rather than the corrupted data segment based on the appended data segment having the greater offset. In some examples, providing the appended data segment rather than the corrupted data segment is performed according to a read operation that is configured to select, between multiple data segments having the same digital fingerprint, the data segment having the greatest offset within the container.

In one embodiment, the computer-implemented method may further include adding, in response to detecting that the data segment stored within deduplication storage is corrupted, the digital fingerprint of the data segment to a fingerprint corruption list that identifies corrupted data segments. In some examples, the computer-implemented method may further include adding an identifier of the container together with the digital fingerprint of the data segment to the fingerprint corruption list.

In one embodiment, the computer-implemented method may further include, during the backup operation, checking the fingerprint corruption list to determine that the digital fingerprint of the data segment of the image being backed up matches the digital fingerprint of the corrupted data segment that was taken prior to corruption and that is already stored within the deduplication storage. In one embodiment, the data segment is appended to the container that already contains the corrupted data segment, rather than a different container, at least in part by referencing the identifier of the container for the corrupted data segment within the fingerprint corruption list. In one embodiment, the computer-implemented method may further include marking, in response to detecting that the data segment stored within the deduplication storage is corrupted, the data segment with a corruption flag set as true.

In one embodiment, a system for implementing the above-described method may include (i) a detection module, stored in memory, that detects that a data segment stored within deduplication storage is corrupted by executing an algorithm on the data segment to generate a numerical identifier for the data segment and determining that the numerical identifier does not match a previously stored numerical identifier for the data segment, (ii) a checking module, stored in memory, that checks, during a backup operation, whether a digital fingerprint of a data segment of an image being backed up matches a digital fingerprint of the corrupted data segment that was taken prior to corruption and that is already stored within the deduplication storage, (iii) an appending module, stored in memory, that appends, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment, and (iv) at least one physical processor configured to execute the detection module, the checking module, and the appending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that a data segment stored within deduplication storage is corrupted by executing an algorithm on the data segment to generate a numerical identifier for the data segment and determining that the numerical identifier does not match a previously stored numerical identifier for the data segment, (ii) check, during a backup operation, whether a digital fingerprint of a data segment of an image being backed up matches a digital fingerprint of the corrupted data segment that was taken prior to corruption and that is already stored within the deduplication storage, and (iii) append, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
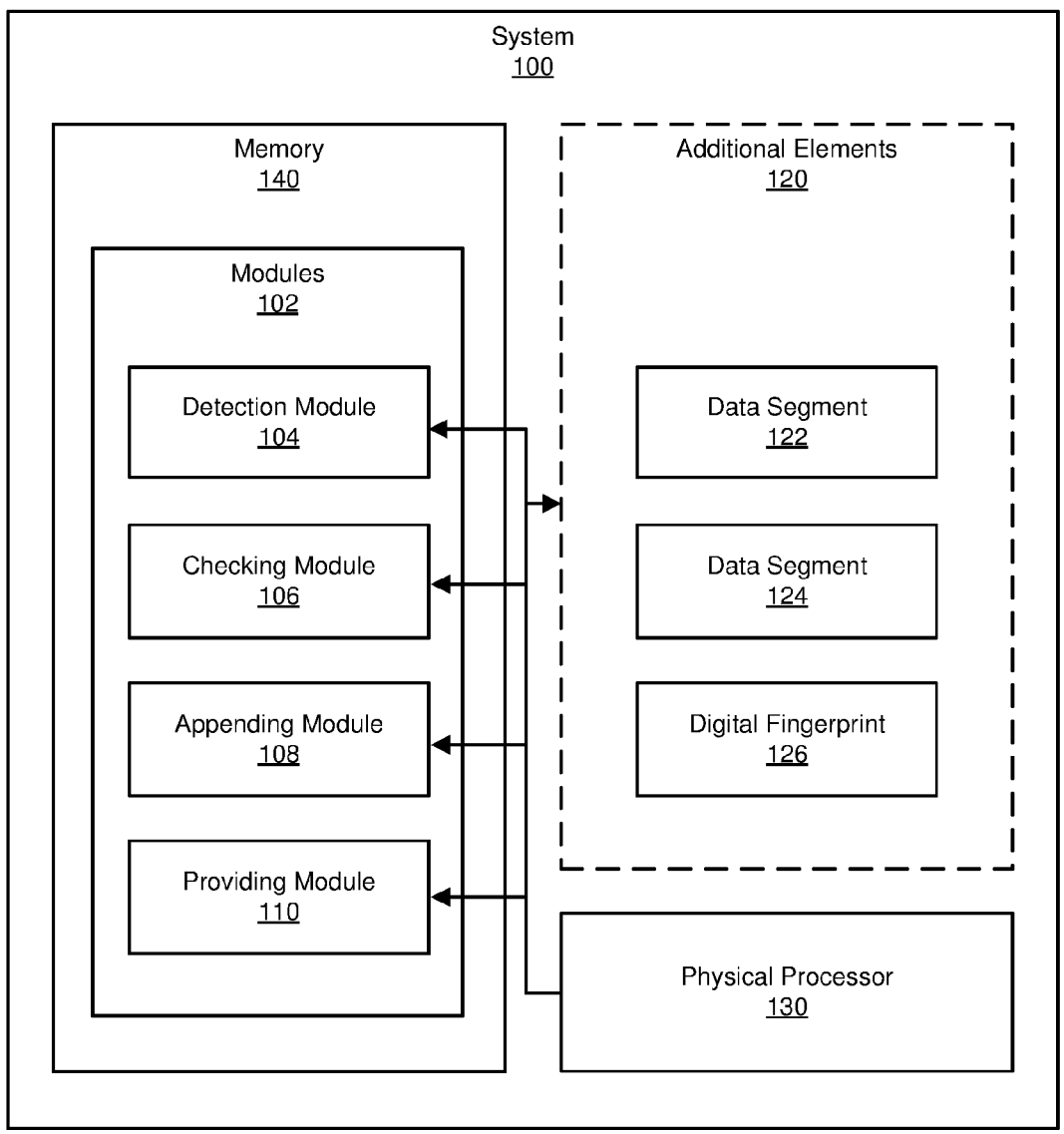
FIG. 1 is a block diagram of an example system for healing images in deduplication storage.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for healing images in deduplication storage. These systems and methods may obtain various benefits over other related systems. For example, the systems and methods may automatically or autonomously heal images within a deduplication system, rather than simply marking data segments as corrupted and further preventing images from referencing the corrupted data segments. The systems and methods may achieve these benefits by leveraging non-corrupted copies of the data segments that are still available on client devices that interface with the deduplication system or server. In other words, even after a data segment becomes corrupted at the deduplication system or server, one or more clients or customers may still possess a non-corrupted instance of the data segment. Additionally, the client or customer may upload the non-corrupted instance of the data segment to the deduplication system or server. For example, the client or customer may upload the non-corrupted instance of the data segment as part of a backup operation to newly backup a disk image to the deduplication system.

Additionally, the disclosed systems and methods may append the non-corrupted data segment to the same container where the corrupted data segment is stored, rather than replacing the content of the corrupted data segment within the container with the non-corrupted content, and rather than writing the non-corrupted data segment to a new or different container. The disclosed systems and methods thereby avoid numerous problems associated with these alternative methods. For example, simply replacing the content of the corrupted data segment with the content of the non-corrupted data segment might result in the problem that the non-corrupted data segment is simply written to a bad or failed portion of a storage device, thereby repeating the corruption of the data segment. Additionally, deduplication systems may use a compression scheme that does not necessarily generate the same size of compressed data even if the original data has the same size, and, therefore, the compressed non-corrupted data segment may not fit within the storage space occupied by the corrupted data segment. Moreover, simply writing the non-corrupted data segment to a new container, rather than the same container, may result in extensively modifying metadata of images that reference the corrupted data segment, which may be cost prohibitive.

Figure 2:
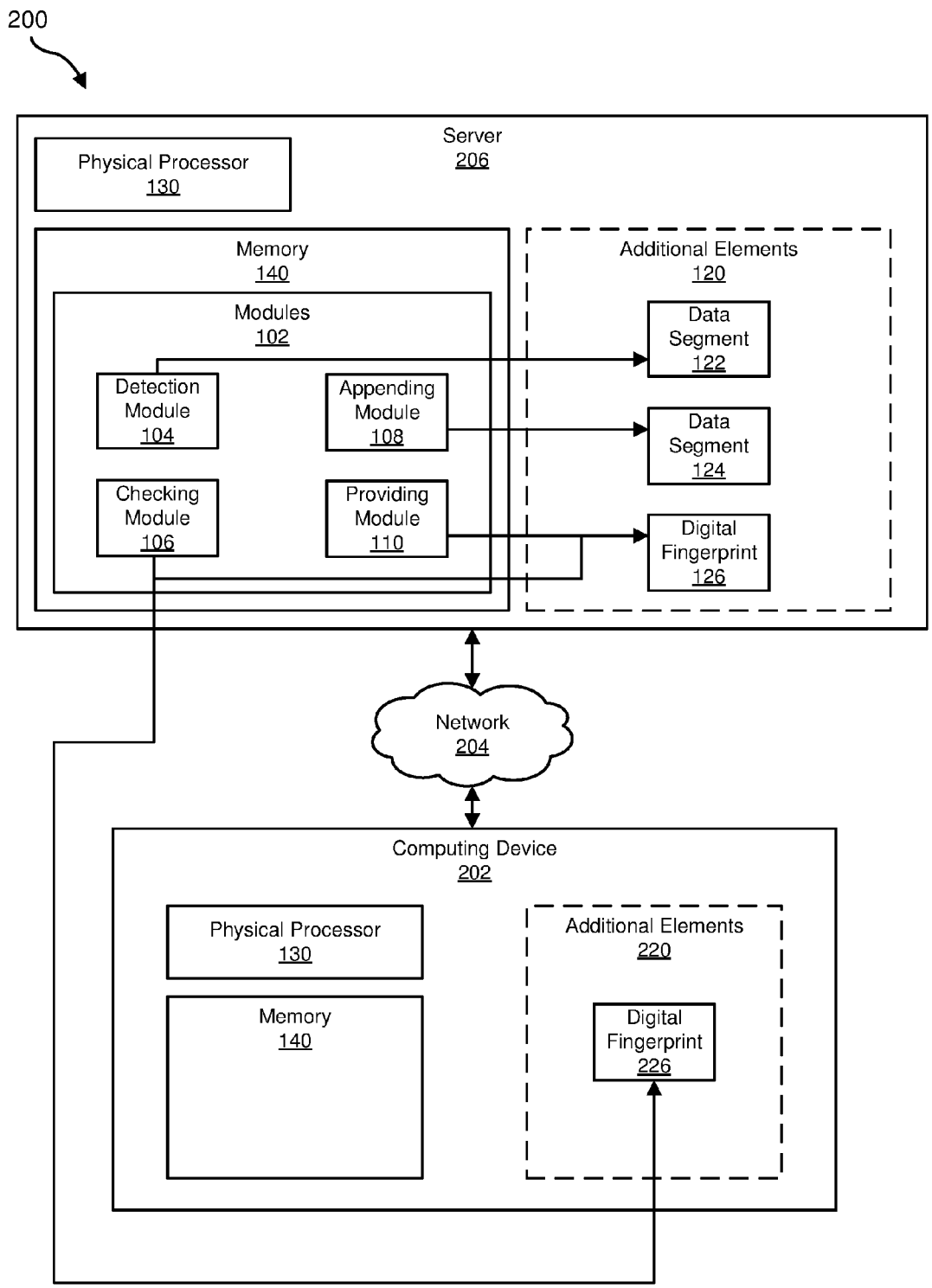
FIG. 2 is a block diagram of an additional example system for healing images in deduplication storage.

The following will provide, with reference to FIGS. 1-2, detailed descriptions of example systems for healing images in deduplication storage. Detailed descriptions of corresponding computer-implemented methods will also be provided in connection with FIGS. 3-5.

FIG. 1 is a block diagram of example system 100 for healing images in deduplication storage. As illustrated in this figure, example system 100 may include one or more modules 102 for performing one or more tasks. For example, and as will be explained in greater detail below, example system 100 may include a detection module 104 that detects that a data segment stored within deduplication storage is corrupted by executing an algorithm on the data segment to generate a numerical identifier for the data segment and determining that the numerical identifier does not match a previously stored numerical identifier for the data segment. Example system 100 may additionally include a checking module 106 that checks, during a backup operation, whether a digital fingerprint of a data segment of an image being backed up matches a digital fingerprint of the corrupted data segment that was taken prior to corruption and that is already stored within the deduplication storage. Example system 100 may also include an appending module 108 that appends, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment. Additionally, example system 100 may further include a providing module 110 that performs various further functions, as discussed further below. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate healing images in deduplication storage. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as a data segment 122, a data segment 124, and a digital fingerprint 126. Data segment 122 may correspond to the corrupted data segment and data segment 124 may correspond to a non-corrupted instance of the same data segment, as discussed further below. Additionally, digital fingerprint 126 may correspond to a digital fingerprint of data segment 122 that was taken prior to the corruption of data segment 122. In general, additional elements 120 may be stored as data structures or elements within a corresponding storage device, such as memory 140.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to healing images in deduplication storage.

For example, detection module 104 may detect that data segment 122 stored within deduplication storage (which may correspond to server 206) is corrupted by executing an algorithm on data segment 122 to generate a numerical identifier for data segment 122 and determining that the numerical identifier does not match a previously stored numerical identifier for data segment 122. Similarly, checking module 106 may check, during a backup operation, whether a digital fingerprint 226 (within additional elements 220 at computing device 202) of another data segment 124 of an image being backed up (e.g., being backed up from a client or customer corresponding to computing device 202) matches digital fingerprint 126 of corrupted data segment 122 that was taken prior to corruption and that is already stored within the deduplication storage. Lastly, appending module 108 may append, in response to checking module 106 determining that digital fingerprint 226 of data segment 124 of the image being backed up matches digital fingerprint 126 of corrupted data segment 122, data segment 124 from the image being backed up to a container that already contains corrupted data segment 122 rather than replacing corrupted data segment 122. In this case, an offset of appended data segment 124 may be greater within the container than an offset of corrupted data segment 122 within the same container.

Computing device 202 generally represents any type or form of computing device capable of reading computer-executable instructions. In some embodiments, computing device 202 may correspond to a client or customer device that performs backup and/or restoration operations through server 206, which corresponds to a deduplication storage system. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of facilitating the storage of data through deduplication, as discussed further below. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
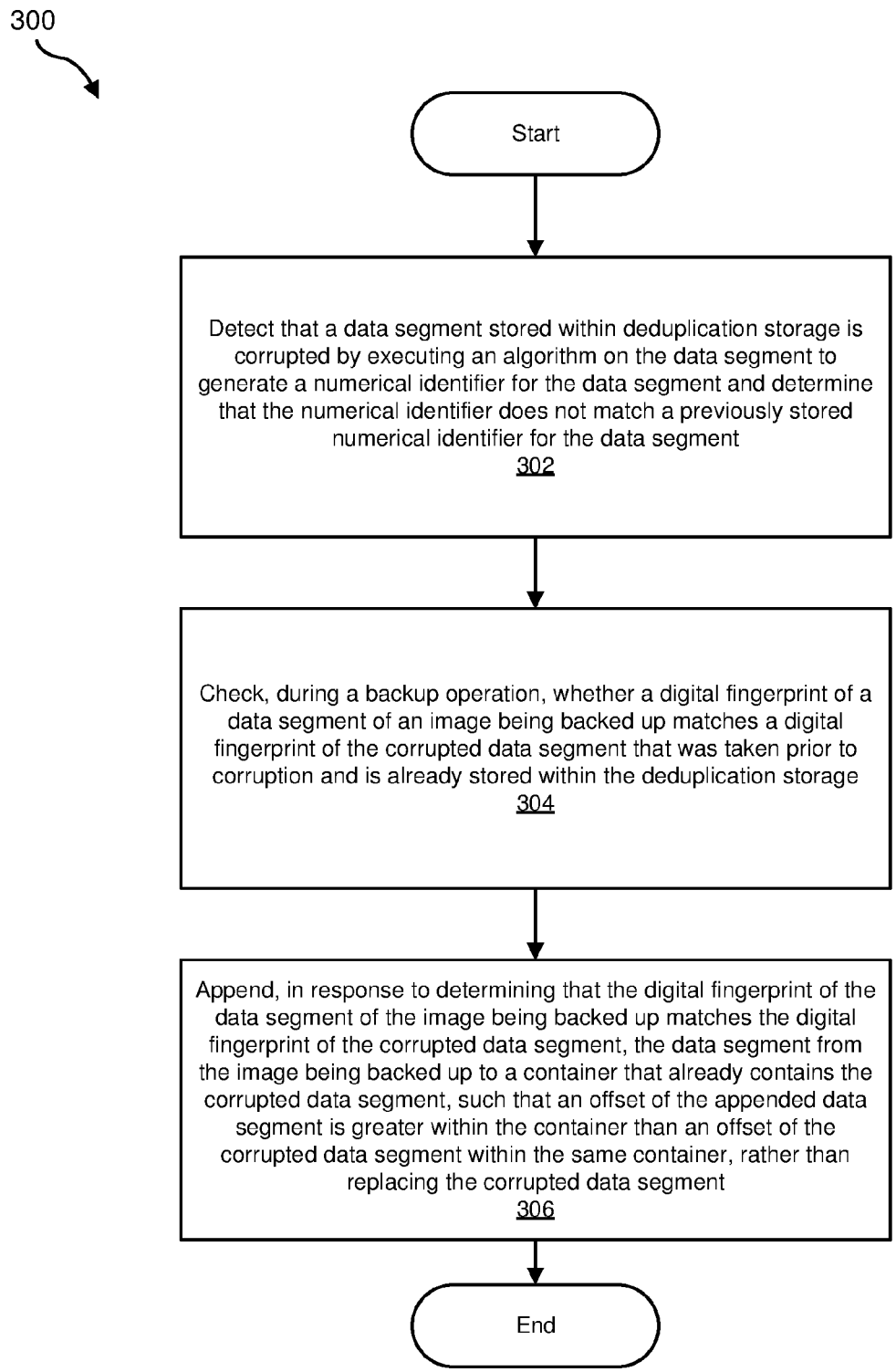
FIG. 3 is a flow diagram of an example method for healing images in deduplication storage.

FIG. 3 is a flow diagram of an example computer-implemented method 300 for healing images in deduplication storage. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect that a data segment stored within deduplication storage is corrupted by executing an algorithm on the data segment to generate a numerical identifier for the data segment and determining that the numerical identifier does not match a previously stored numerical identifier for the data segment. For example, detection module 104 may, as part of server 206 in FIG. 2, detect that data segment 122 stored within server 206 is corrupted by executing an algorithm on data segment 122 to generate a numerical identifier for data segment 122 and determining that the numerical identifier does not match a previously stored numerical identifier for data segment 122.

As used herein, the term "data segment" generally refers to a segment of data that a deduplication system may reference multiple times instead of storing multiple copies of the corresponding data, thereby achieving deduplication. In some embodiments, a deduplication system may only store a single instance of a data segment, which may be unique within the deduplication system, and thereby enable any further instances of the data segment to be effectively stored by referencing the single instance of the data segment. Additionally, as used herein, the phrase "corrupted" generally refers to any problem, breakdown, and/or error that prevents a deduplication system from accessing a corresponding data segment. In some examples, a data segment may be corrupted through a hardware and/or software fault corresponding to a specific location on a physical storage device.

Detection module 104 may detect that the data segment is corrupted in a variety of ways. In some examples, detection module 104 may detect that the data segment is corrupted by executing at least one of the following on the data segment: (i) a checksum algorithm, (ii) a hash algorithm, and/or (iii) a digital fingerprint algorithm. One or more of these algorithms may generate outputs that identify the data segment in the sense that the algorithm generates that output for the specific data segment but is unlikely, according to a statistical measurement, to generate the same output for a different data segment. In one example, the numerical identifier resulting from the algorithm may correspond to the digital fingerprint of the data segment, such as digital fingerprint 126, which is further referenced by checking module 106 at step 304, as discussed further below.

In one embodiment, detection module 104 may add, in response to detecting that the data segment stored within deduplication storage is corrupted, the digital fingerprint of the data segment to a fingerprint corruption list that identifies corrupted data segments. The digital fingerprint of the data segment may uniquely identify the data segment in the sense that any change in the data segment is unlikely, according to a statistical measurement, to produce the same digital fingerprint. More generally, detection module 104 may maintain a list of corrupted data segments for the purposes of performing method 300. Detection module 104 may maintain the list in part by storing identifiers of the data segments that are detected as corrupted within the list, and these identifiers may include digital fingerprints. The fingerprint corruption list may additionally store an identifier of a container that contains the corrupt data segment, as discussed further below.

As used herein, the term "container" generally refers to a hardware, software, virtual, and/or logical storage device, folder, file, and/or other storage container that stores data segments for deduplication, as further defined above in the context of deduplication storage, at corresponding offsets. In some examples, the containers may store the data segments in a rolling or chronological manner such that later stored data segments are stored at increasing or greater offsets, as discussed further below. In further examples, the deduplication system may create containers for respective images when those images contain data segments that were not previously stored within any other container (i.e., the lack of the data segment within any other container creates a need to generate a new container). In specific examples, the containers correspond to files established by a deduplication storage system for storing data segments. Additionally, in some examples, detection module 104 may mark, in response to detecting that the data segment stored within deduplication storage is corrupted, the data segment with a corruption flag set as true. As used herein, the term "flag" generally refers to any bit, or sequence of bits, that distinguishes between true or false for the purposes of marking whether corresponding data segments are corrupted.

At step 304, one or more of the systems described herein may check, during a backup operation, whether a digital fingerprint of a data segment of an image being backed up matches a digital fingerprint of the corrupted data segment that was taken prior to corruption and that is already stored within the deduplication storage. For example, checking module 106 may, as part of server 206 in FIG. 2, check, during a backup operation, whether digital fingerprint 226 of data segment 124 of the image being backed up matches digital fingerprint 126 of corrupted data segment 122 that was taken prior to corruption and that is already stored within server 206.

Checking module 106 may check whether the two digital fingerprints match in a variety of ways. In some examples, checking module 106 may perform a bit comparison to identify whether any bit is different between the two digital fingerprints. Additionally, in further examples, checking module 106 may retrieve digital fingerprint 126 that was previously stored within the deduplication storage. Digital fingerprint 126 may have been generated or computed at a time prior to the corruption of data segment 122. Accordingly, digital fingerprint 126 may identify the non-corrupted content of data segment 122. By checking whether digital fingerprint 126 matches digital fingerprint 226 of data segment 124 in the process of being uploaded as part of a backup operation, checking module 106 may effectively determine whether one or more client devices, such as computing device 202, additionally contains a non-corrupted version or instance of data segment 122.

In a more specific example, checking module 106 may check the fingerprint corruption list to determine that digital fingerprint 226 of data segment 124 of the image being backed up matches digital fingerprint 126 of corrupted data segment 122 that was taken prior to corruption and that is already stored within the deduplication storage (i.e., may check whether digital fingerprint 226 matches the instance of digital fingerprint 126 stored within the fingerprint corruption list). In other words, checking module 106 may check, during a backup operation, whether the image being backed up contains a non-corrupted version of any one or more of the data segments that are previously detected as corrupted at the deduplication server and identified on the fingerprint corruption list. In other words, for one, some, or all of the data segments referenced by an incoming image in a backup operation, checking module 106 may check whether that data segment matches a digital fingerprint that identifies a data segment that was previously stored within deduplication storage and that has become corrupted. By automatically, routinely, or periodically scanning or searching incoming images, as part of a backup procedure or in response to a backup procedure, for non-corrupted versions of these data segments, modules 102 may thereby leverage the non-corrupted versions of the data segments to automatically heal corresponding images within deduplication storage, as discussed further below.

At step 306, one or more of the systems described herein may append, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment. For example, appending module 108 may, as part of server 206 in FIG. 2, append, in response to checking module 106 determining that digital fingerprint 226 of data segment 124 of the image being backed up matches digital fingerprint 126 of corrupted data segment 122, data segment 124 from the image being backed up to a container that already contains corrupted data segment 122 rather than replacing corrupted data segment 122.

As used herein, the phrase "append" generally refers to adding a data segment to a container at an end or current offset within the container rather than replacing or overwriting a corrupted version of the data segment that was previously stored within the container. In general, the container may store data segments within a deduplication system at respective offsets in a rolling or chronological manner such that the later writing of a data segment will result in the data segment being stored at a greater offset within the container. Moreover, in general, as used herein, the term "container" generally refers to a physical, logical, and/or other storage device or location that is configured to store data segments within a deduplication system at respective offsets, as discussed above.

Appending module 108 may append the non-corrupted instance of the data segment in a variety of ways. In some examples, appending module 108 may append the data segment from the image being backed up to the container in a manner that effectively heals at least one image that references the corrupted data segment. As used herein, the phrase "effectively heals" generally refers to appending the data segment within a deduplication system that is configured to provide the non-corrupted version of the data segment, rather than the previously stored corrupted version of the data segment, in response to attempts to access the data segment (e.g., as part of a restoration process to restore a disk image that references the data segment), thereby overcoming problems associated with the corruption of the data segment. For example, providing module 110 may provide, during a restore operation to restore an image that references the corrupted data segment, the appended data segment rather than the corrupted data segment based on the appended data segment having the greater offset.

In a more specific example, providing module 110 may provide data segment 124 rather than corrupted data segment 122 according to a read operation that is configured to select, between multiple data segments having the same digital fingerprint, the data segment having the greatest offset within the container. Providing module 110 may sort data segments within a container by their offset within the container and thereby provide the data segment with the greater offset based on the sorting. More generally, providing module 110 may be configured to search for a data segment within the container that has a digital fingerprint that matches the digital fingerprint of the data segment prior to corruption, as outlined above. In some examples, providing module 110 may identify multiple data segments that have a matching digital fingerprint. In these examples, providing module 110 may be configured to select the data segment having the greatest offset within the container. Additionally, or alternatively, providing module 110 may be configured to simply select the data segment that is not detected as corrupted, such as by referencing a corresponding corruption flag for the data segment, as discussed further below. In other examples, providing module 110 may simply search the container for a data segment having a matching digital fingerprint in a manner that ensures that the first found data segment having a matching digital fingerprint has the greatest offset within the container. In other words, providing module 110 may search the container for data segments having a matching digital fingerprint in a direction from higher offsets to lower offsets.

Figure 4:
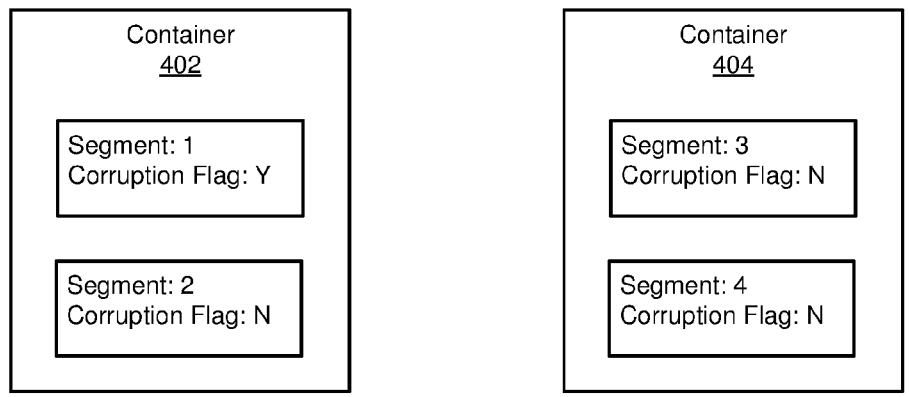
FIG. 4 is a block diagram of example containers referenced by an example computing system prior to healing being performed.
Figure 4:
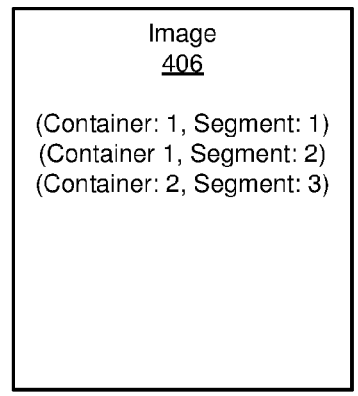

FIG. 4 shows an illustration 400 of how a container 402 and a container 404 store various data segments referenced by an image 406 after one of the data segments has already been corrupted. Specifically, container 402 contains two data segments, data segment 1 and data segment 2. In the example of this figure, these containers also store a flag for each data segment that specifies whether the data segment is corrupted or not. Although, in this example, a flag is stored for every data segment, in other examples a flag may be inserted for a data segment only if the data segment is detected as corrupted, as outlined above. As further shown in FIG. 4, in this example, deduplication storage enables the restoration of image 406 by referencing the three data segments that form image 406, data segment 1 stored within container 1, data segment 2 stored within container 1, and data segment 3 stored within container 2. Notably, all of the data segments stored within container 402 and 404 are non-corrupted except for data segment 1 stored within container 402, which has been corrupted, as discussed above, and which therefore has a corresponding corruption flag set as true.

Figure 5:
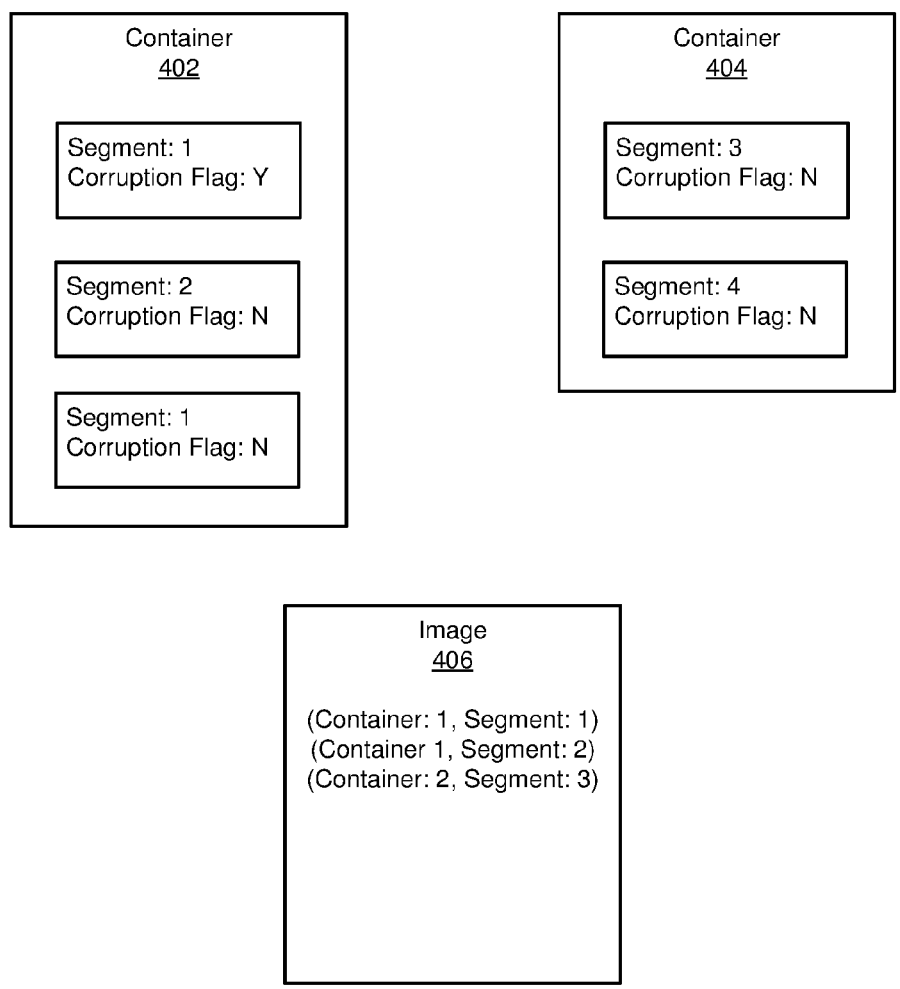
FIG. 5 is a block diagram of example containers referenced by the example computing system after healing is performed.

FIG. 5 shows an illustration 500 that further illustrates how container 402 and container 404 store the data segments referenced by image 406 after a corrupted data segment has been healed, as discussed further below. Specifically, FIG. 5 further shows that a non-corrupted version of data segment 1 has been appended to container 402 (e.g., at the end or current writing location for container 402). Because the newly added non-corrupted version of data segment 1 is not corrupted, the corresponding corruption flag has not been set as true. Accordingly, during a restoration operation to restore image 406, providing module 110 may provide a version of data segment 1 from container 402 that is not corrupted by providing the appended data segment 1 rather than the corrupted and previously stored data segment 1. Providing module 110 may provide the non-corrupted version of the data segment in any of the manners outlined above. For example, providing module 110 may search for a matching data segment within container 402 in a direction from a higher offset to a lower offset, thereby encountering, within the search, the non-corrupted version of the data segment first. Providing module 110 may also search (e.g., in the direction from higher offset to lower offset) for the first matching data segment within container 402 that does not have the corruption flag set as true. In other examples, providing module 110 may identify all of the matching data segments within container 402 and then select a data segment that has a highest offset and/or has a corruption flag set as false, as further discussed above.

Additionally, in some examples, appending module 108 may append the data segment to the container that already contains the corrupted data segment, rather than a different container, at least in part by referencing the identifier of the container for the corrupted data segment within the fingerprint corruption list. In other words, detection module 104 may add one or both of the digital fingerprint of a corrupted data segment and/or an identifier of a container where the corrupted data segment is stored to the fingerprint corruption list. Appending module 108 may determine to which container to append the non-corrupted data segment by simply referencing the identifier of the container stored within the fingerprint corruption list that identifies where the corrupted data segment is already stored, thereby enabling appending module 108 to append the non-corrupted data segment to the same container.

The above discussion provided an overview of embodiments of the disclosed systems and methods with reference to method 300 of FIG. 3. Additionally, the following discussion provides a more specific overview of details of concrete embodiments of the disclosed systems and methods. The disclosed systems and methods present a mechanism to automatically fix image corruption with good data segments from a new backup in a deduplication system. In a deduplication system, one corrupted segment can lead to many data images becoming corrupted, so in a storage system such as VERITAS MEDIA SERVER DEDUPLICATION POOL, an online checking mechanism may be introduced to prevent the corrupted data segments from being referenced by future backups. Nevertheless, in these examples, the deduplication system may lack a mechanism to automatically fix a corrupted image with data segments from new backups. Most of the time, good data segments still exist on the client side and come to the deduplication server with new backups. The disclosed systems and methods may automatically fix corrupted images with the incoming good data segments.

The self-healing mechanism may include one or more of the following three operations. An online or corruption-detection process, such as a cyclic redundancy check, may calculate the checksum of a stored data segment and compare it to a previously stored checksum (i.e., a previously stored checksum that was calculated prior to a corruption of the data segment). If there is a mismatch, the data segment is marked with a corruption flag set as true. The corrupted fingerprint together with its container identifier may be added to a fingerprint corruption list. During backup operations, a query will be performed to check whether one or more digital fingerprints for non-corrupted data segments referenced by an image being uploaded matches one or more digital fingerprints stored within the fingerprint corruption list. If a match is found within the fingerprint corruption list, the non-corrupted data segment will be uploaded and appended to the same container. Additionally, the fingerprint of the data segment may be removed from the fingerprint corruption list. If the fingerprint is not found in the fingerprint corruption list, the digital fingerprint is checked against the normal deduplication fingerprint indices (e.g., the previously established containers), and if no match is found, then a new container may be generated and the data segment may be stored within the new container. During an image restore operation, if there are more than one data segment in a container having the same digital fingerprint, then the restore operation may use the data segment with the largest offset within the container to perform restoration.

Appending the non-corrupted data segment to the same container rather than replacing the content of the corrupted data segment and/or writing the non-corrupted data segment to a different container avoids problems associated with these alternative solutions. Specifically, in the case of replacing the content of the corrupted data segment, the data segment may be corrupted due to a failure of a portion of physical storage, such as a silent hard disk sector. Accordingly, the data segment may become corrupted again after copying the non-corrupted data segment to the same location. Additionally, replacing the content of the corrupted data segment may be impossible due to a compression scheme, such as Lempel-Ziv-Oberhumer compression, that does not necessarily generate the same size of compressed data even despite using the same original data segment content. Furthermore, writing the non-corrupted data segment to a different container rather than the same container may result in modifying some or all of the metadata for some or all of the images referencing the corrupted data segment. Similarly, writing the non-corrupted data segment to a different container may result in adding corresponding image references to the different (e.g., new) container. The corresponding costs may be prohibitive.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for healing images in deduplication storage, at least a portion of the method being performed by a computing device comprising at least one processor, the method comprising:
    detecting that a data segment stored within deduplication storage is corrupted by executing an algorithm on the data segment to generate a numerical identifier for the data segment and determining that the numerical identifier does not match a previously stored numerical identifier for the data segment;
    checking, during a backup operation, whether a digital fingerprint of a data segment of an image being backed up matches a digital fingerprint of the corrupted data segment that was taken prior to corruption and that is already stored within the deduplication storage; and
    appending, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment.

2. The computer-implemented method of claim 1, wherein the algorithm comprises at least one of:
    a checksum algorithm;
    a hash algorithm; and
    a digital fingerprint algorithm.

3. The computer-implemented method of claim 1, wherein appending the data segment from the image being backed up to the container effectively heals at least one image that references the corrupted data segment.

4. The computer-implemented method of claim 1, further comprising providing, during a restore operation to restore an image that references the corrupted data segment, the appended data segment rather than the corrupted data segment based on the appended data segment having the greater offset.

5. The computer-implemented method of claim 4, wherein providing the appended data segment rather than the corrupted data segment is performed according to a read operation that is configured to select, between multiple data segments having the same digital fingerprint, the data segment having the greatest offset within the container.

6. The computer-implemented method of claim 1, further comprising adding, in response to detecting that the data segment stored within deduplication storage is corrupted, the digital fingerprint of the data segment to a fingerprint corruption list that identifies corrupted data segments.

7. The computer-implemented method of claim 6, further comprising adding an identifier of the container together with the digital fingerprint of the data segment to the fingerprint corruption list.

8. The computer-implemented method of claim 7, wherein the data segment is appended to the container that already contains the corrupted data segment, rather than a different container, at least in part by referencing the identifier of the container for the corrupted data segment within the fingerprint corruption list.

9. The computer-implemented method of claim 6, further comprising checking, during the backup operation, the fingerprint corruption list to determine that the digital fingerprint of the data segment of the image being backed up matches the digital fingerprint of the corrupted data segment that was taken prior to corruption and that is already stored within the deduplication storage.

10. The computer-implemented method of claim 1, further comprising marking, in response to detecting that the data segment stored within the deduplication storage is corrupted, the data segment with a corruption flag set as true.

11. A system for healing images in deduplication storage, the system comprising:
a detection module, stored in memory, that detects that a data segment stored within deduplication storage is corrupted by executing an algorithm on the data segment to generate a numerical identifier for the data segment and determining that the numerical identifier does not match a previously stored numerical identifier for the data segment;
a checking module, stored in memory, that checks, during a backup operation, whether a digital fingerprint of a data segment of an image being backed up matches a digital fingerprint of the corrupted data segment that was taken prior to corruption and that is already stored within the deduplication storage;
an appending module, stored in memory, that appends, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment; and
at least one physical processor configured to execute the detection module, the checking module, and the appending module.

12. The system of claim 11, wherein the algorithm comprises at least one of:
a checksum algorithm;
a hash algorithm; and
a digital fingerprint algorithm.

13. The system of claim 11, wherein the appending module appends the data segment from the image being backed up to the container in a manner that effectively heals at least one image that references the corrupted data segment.

14. The system of claim 11, further comprising a providing module, stored in memory, that provides, during a restore operation to restore an image that references the corrupted data segment, the appended data segment rather than the corrupted data segment based on the appended data segment having the greater offset.

15. The system of claim 14, wherein the providing module provides the appended data segment rather than the corrupted data segment according to a read operation that is configured to select, between multiple data segments having the same digital fingerprint, the data segment having the greatest offset within the container.

16. The system of claim 11, wherein the detection module adds, in response to detecting that the data segment stored within deduplication storage is corrupted, the digital fingerprint of the data segment to a fingerprint corruption list that identifies corrupted data segments.

17. The system of claim 16, wherein the detection module adds an identifier of the container together with the digital fingerprint of the data segment to the fingerprint corruption list.

18. The system of claim 17, wherein the appending module appends the data segment to the container that already contains the corrupted data segment, rather than a different container, at least in part by referencing the identifier of the container for the corrupted data segment within the fingerprint corruption list.

19. The system of claim 16, wherein the detection module further checks, during the backup operation, the fingerprint corruption list to determine that the digital fingerprint of the data segment of the image being backed up matches the digital fingerprint of the corrupted data segment that was taken prior to corruption and that is already stored within the deduplication storage.

20. A non-transitory computer-readable medium comprising one or more computer-readable instructions that, when executed by at least one processor of a computing device, cause the computing device to:
detect that a data segment stored within deduplication storage is corrupted by executing an algorithm on the data segment to generate a numerical identifier for the data segment and determining that the numerical identifier does not match a previously stored numerical identifier for the data segment;
check, during a backup operation, whether a digital fingerprint of a data segment of an image being backed up matches a digital fingerprint of the corrupted data segment that was taken prior to corruption and that is already stored within the deduplication storage; and
append, in response to determining that the digital fingerprint of the data segment of the image being backed up matches the digital fingerprint of the corrupted data segment, the data segment from the image being backed up to a container that already contains the corrupted data segment, such that an offset of the appended data segment is greater within the container than an offset of the corrupted data segment within the same container, rather than replacing the corrupted data segment.

\* \* \* \* \*